(12) United States Patent  (10) Patent No.: US 9,387,852 B2
Meitinger et al.  (45) Date of Patent: Jul. 12, 2016

(54) METHOD FOR ADJUSTING THE SPATIAL POSITION OF THE ROLL AXIS OF A MOTOR VEHICLE

(75) Inventors: Karl-Heinz Meitinger, München (DE); Michael Bär, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 12 days.

(21) Appl. No.: 13/825,683

(22) PCT Filed: Sep. 22, 2011

(86) PCT No.: PCT/EP2011/004738
§ 371 (c)(1),
(2), (4) Date: Apr. 26, 2013

(87) PCT Pub. No.: WO2012/038082
PCT Pub. Date: Mar. 29, 2012

(65) Prior Publication Data
US 2013/0218414 A1  Aug. 22, 2013

(30) Foreign Application Priority Data
Sep. 23, 2010 (DE) .......................... 10 2010 046 317

(51) Int. Cl.
*B60W 10/22* (2006.01)
*B60W 30/02* (2012.01)
(Continued)

(52) U.S. Cl.
CPC ......... *B60W 30/025* (2013.01); *B60G 17/0162* (2013.01); *B60G 17/0195* (2013.01); *B60W 10/20* (2013.01); *B60W 10/22* (2013.01); *B60G 2400/104* (2013.01); *B60G 2400/62* (2013.01); *B60G 2500/40* (2013.01);
(Continued)

(58) Field of Classification Search
USPC .......................................................... 701/38
See application file for complete search history.

(56) References Cited

U.S. PATENT DOCUMENTS 3,542,147 A  11/1970  Shakespear et al.
3,889,968 A  6/1975  Wilfert et al.
(Continued)

FOREIGN PATENT DOCUMENTS

DE  1 908 231  9/1969
DE  196 48 497  6/1997
(Continued)

OTHER PUBLICATIONS

International Search Report issued by the European Patent Office in International Application PCT/EP2011/004738 on Jan. 19, 2012.

*Primary Examiner* — John R Olszewski
*Assistant Examiner* — Jean-Paul Cass
(74) *Attorney, Agent, or Firm* — Henry M. Feiereisen LLC.

(57) ABSTRACT

A method for adjusting the spatial position of the roll axis of a motor vehicle includes: a) defining a desired spatial position of the roll axis; b) determining a transverse acceleration of the motor vehicle; c) defining a desired transverse tilt of the motor vehicle and determining a desired transverse offset of the motor vehicle as a function of the transverse acceleration, so that the roll axis is moved into the desired position when the desired transverse tilt and the desired transverse offset are adjusted; d) adjusting a first actuator of an active chassis system of the motor vehicle, so that the motor vehicle assumes the desired transverse tilt determined in step c); and adjusting a second actuator to influence the transverse movement of the motor vehicle, so that the motor vehicle assumes the desired transverse offset determined in step c).

7 Claims, 4 Drawing Sheets

(51) Int. Cl.
  *B60W 10/20* (2006.01)
  *B60G 17/016* (2006.01)
  *B60G 17/0195* (2006.01)
  *B60W 30/18* (2012.01)

(52) U.S. Cl.
  CPC .... *B60G 2600/182* (2013.01); *B60G 2800/012* (2013.01); *B60G 2800/24* (2013.01); *B60G 2800/9123* (2013.01); *B60G 2800/965* (2013.01); *B60G 2800/98* (2013.01); *B60W 30/18145* (2013.01)

(56) References Cited

U.S. PATENT DOCUMENTS

| | | | |
|---|---|---|---|
| 5,934,407 | A | 8/1999 | Shimizu et al. |
| 7,330,785 | B2 | 2/2008 | Odenthal et al. |
| 7,590,481 | B2 | 9/2009 | Lu et al. |
| 7,715,965 | B2 | 5/2010 | Messih et al. |
| 8,078,349 | B1 * | 12/2011 | Prada Gomez ...... G05D 1/0061 701/1 |
| 8,271,175 | B2 * | 9/2012 | Takenaka ............ B60T 8/17551 701/70 |
| 2005/0197746 | A1 | 9/2005 | Pelchen et al. |
| 2007/0021887 | A1 | 1/2007 | Hofmann et al. |
| 2008/0269974 | A1 | 10/2008 | Schwarz et al. |
| 2010/0036557 | A1 * | 2/2010 | Lu ........................ B60T 8/172 701/38 |
| 2013/0041545 | A1 * | 2/2013 | Bar .................... B60G 17/0162 701/23 |
| 2014/0054867 | A1 * | 2/2014 | Kim .................... B60G 17/0162 280/5.509 |

FOREIGN PATENT DOCUMENTS

| | | |
|---|---|---|
| DE | 19648497 A1 * | 6/1997 |
| DE | 199 18 597 | 11/2000 |
| DE | 100 60 536 | 6/2002 |
| DE | 102004040876 | 12/2005 |
| DE | 102004049086 | 4/2006 |
| DE | 102005048718 | 6/2006 |
| DE | 102005033995 | 2/2007 |
| DE | 102006042961 | 4/2007 |
| DE | 102006033631 | 1/2008 |
| DE | 102006033635 | 1/2008 |
| DE | 102007051204 | 4/2009 |
| DE | 102007051218 | 4/2009 |
| DE | 102008040051 | 1/2010 |
| DE | 102009014747 | 12/2010 |
| EP | 2 020 313 | 2/2009 |
| EP | 2020313 A3 * | 3/2011 |
| FR | 2 924 053 | 5/2009 |
| WO | WO 2006/007908 | 1/2006 |
| WO | WO 03004330 A1 * | 7/2006 |
| WO | WO 2009/053075 | 4/2009 |

* cited by examiner

METHOD FOR ADJUSTING THE SPATIAL POSITION OF THE ROLL AXIS OF A MOTOR VEHICLE

CROSS-REFERENCES TO RELATED APPLICATIONS

This application is the U.S. National Stage of International Application No. PCT/EP2011/004738, filed Sep. 22, 2011, which designated the United States and has been published as International Publication No. WO 2012/038082 A1 and which claims the priority of German Patent Application, Serial No. 10 2010 046 317.5, filed Sep. 23, 2010, pursuant to 35 U.S.C. 119(a)-(d).

BACKGROUND OF THE INVENTION

The invention relates to a method for adjusting the spatial position of the roll axis of a motor vehicle.

Motor vehicles with active suspension systems and/or stabilizers, referred to as Active Body Control (ABC), are known, wherein their controllable suspension characteristics enable an intentional compensation of pitch and roll. Typically, the vertical position of each wheel can be adjusted electro-hydraulically. This improves the driving characteristics of a motor vehicle, in particular during cornering, for example in that the motor vehicle actively leans into the turn.

A method for controlling actuators of an active suspension system is known from the German patent application 102009014747.0-21 filed Mar. 25, 2009, which enables intentional control of the roll angle of a vehicle. The individual actuators, which determine the vertical wheel position of the individual wheels, are controlled so as to generate a roll motion of the vehicle toward the inside of the turn. In a situation with partial or fully automatic vehicle guidance, the transverse force acting on the vehicle occupants is automatically reduced so as to establish a comfortable ride. The transverse acceleration can be computed in advance in the automatic driving mode with a route preview and the roll motion of the vehicle can be adjusted accordingly.

DE 10 2004 040 876 A1 discloses a method for regulating the driving dynamics of a vehicle, wherein the rotation of the vehicle about its vertical axis is affected by detecting and changing the distribution of the roll torque. The distribution of the roll torque can be regulated by adjustable dampers on the wheels of the vehicle. However, a roll angle and a transverse guidance of the vehicle are hereby not automatically set.

DE 10 2007 051 218 A1 and DE 10 2006 042 961 A1 describe methods for computing either the roll rate or the positions of variable roll, pitch and yaw axes of a vehicle. The roll axis is hereby formed passively and is taken into account only in the calculation. More particularly, the roll axis is not actively adjusted.

DE 10 2005 048 718 A9 describes a control system controlling the vehicle dynamics, with which the instantaneous roll state can be determined as a function of additional masses (for example, roof load) of the vehicle. The roll behavior of the vehicle can be influenced, for example, to prevent a possible rollover of the vehicle.

DE 199 18 597 C2 and DE 10 2006 033 635 A1 discloses processes for stabilizing a vehicle by intervening in the steering via actuators.

SUMMARY OF THE INVENTION

It is an object of the invention to provide a method with which the spatial position of the roll axis of a motor vehicle can be more flexibly set and with which the ride comfort for the occupants of the motor vehicle can be improved.

With the method according to the invention, the spatial position of the roll axis of a motor vehicle can be adjusted. The roll axis refers to a longitudinal axis of the motor vehicle which represents an axis of rotation for an at least partial rotary movement of the motor vehicle. Such rotary movements, which are also referred to as rolling, occur especially during cornering of the motor vehicle, where transverse accelerations produced by the centrifugal force cause the motor vehicle to rotate or tilt. The method according to the invention includes several method steps:

a) A desired spatial position for the roll axis is defined. In particular, this desired position can be selected so that a particularly pleasant and largely undisturbed driving sensation results for the occupants of the motor vehicle when the motor vehicle rotates about the roll axis. This applies particularly to a situation wherein the effective transverse accelerations acting on the occupants are at least partially compensated. The desired spatial position of the roll axis can in particular deviate from the spatial position of the roll axis, which the vehicle has inherently due to its structural design, i.e. without additional control intervention. When several occupants are inside the vehicle, the desired position of the roll axis can be selected such that on average all occupants experience a particularly comfortable driving experience. In particular, the desired spatial position for the roll axis can be specified as a function of the number of vehicle occupants and/or the position of the vehicle occupants.

b) A transverse acceleration of the motor vehicle is determined. The determination can be made, for example, by measuring the current and/or instantaneous transverse acceleration. However, the transverse acceleration of the motor vehicle may also be determined in advance for a future time. This can be accomplished, for example, by using suitable vehicle models through computation and/or as part of a provided route preview. An expected transverse acceleration may also be estimated from existing data.

c) In order to cause a displacement of the roll axis into the desired position determined in step a), a desired transverse tilt of the motor vehicle is defined and a desired transverse offset of the motor vehicle is determined. In particular, the course of the desired transverse tilt may also be determined, which is done in response to the transverse acceleration determined in step b). When the thus defined or determined desired transverse tilt or desired transverse offset are set, the roll axis is displaced into in the desired position. The term transverse tilt refers to the rotation of the motor vehicle about the roll axis. Without transverse accelerations acting on the motor vehicle, the motor vehicle has a transverse tilt angle of 0°. However, when transverse accelerations act on the vehicle, this transverse tilt angle is typically different from 0°. The transverse offset defines an actual course on which the motor vehicle travels, and which has a parallel offset from the originally desired course. The distance between the original trajectory and the actual trajectory is thus given by the transverse offset. A motor vehicle can change over by a transverse movement relative to the planned trajectory into a movement along the new trajectory. The transverse offset can also be referred to as transverse offset of the new trajectory with respect to the original trajectory. In step c) of the method, changes in transverse tilt and the transverse offset of the motor vehicle are more particularly set such that these two parameters together cause a displacement of the roll axis in the desired position. Transverse offset and transverse tilt are hereby functions of the transverse acceleration. The functional relationship may be represented by, for example, stored characteristic curves or mathematical equations.

d) In the last method step, actuators are adjusted so as to produce the desired transverse tilt and the desired transverse offset determined in step c). Actuators of an active suspension device are adjusted so that the motor vehicle can assume the determined desired transverse tilt; conversely, the desired transverse offset of the motor vehicle is assumed by adjusting at least one actuator which is used to affect the transverse movement of the motor vehicle. The actuators of the active suspension device may be, in particular, electro-hydraulic actuators which act on the individual wheels of the motor vehicle and control their vertical position. The active suspension device may be an active suspension system, such as an active body control system and/or a system with active stabilizers. In particular, the individual actuators of the respective wheels may be controlled so as to raise and lower only certain wheels, thereby adjusting the predetermined desired transverse tilt of the entire motor vehicle.

According to the prior art, a flexible adjustment of the spatial position of the roll axis is not possible. In particular, the axis about which the vehicle actively rolls cannot be freely determined by the vertical actuators. A displacement in an arbitrary direction is not readily possible. The roll axis can therefore usually not be placed at the optimum point which produces an optimal result for the driving sensation of motor vehicle occupants. With the proposed method, both the transverse tilt and the transverse offset of the motor vehicle are adjusted such that the roll axis can be moved into a predeterminable desired position. The desired position can be defined very flexibly, so that a very comfortable driving sensation is produced in particular for the vehicle occupants. In this way, the roll axis can be displaced as necessary and efficiently in an uncomplicated manner. In particular, the roll axis can be moved upward when the vehicle performs an intentional transverse movement. The necessary transverse movement or transverse offset can be computed, for example, with a compensating system and transmitted to the respective actuators for automatic vehicle guidance. With the method, a motor vehicle can thus be actively tilted into a traveled turn. The uncomfortable transverse accelerations acting on the occupants can hence be reduced. The subjective ride comfort is improved significantly. The motor vehicle thus does not necessarily roll about the roll axis of the motor vehicle predetermined by its structure; instead, this roll axis can be intentionally moved through cooperation of the actively adjusted transverse tilt and the transverse movement. In particular, the travel range of the individual actuators of the active suspension device can also be better utilized by influencing the transverse movement of the motor vehicle, so that in particular less travel range is required.

Preferably, in step d) of the method, the transverse movement of the motor vehicle is adjusted via an intervention in a steering system of the motor vehicle. In particular, a steering actuator can be used to actively intervene in the steering movement of the motor vehicle. For example, a suitably designed system for vehicle guidance adjusts the additional transverse offset by way of a steering operation which is performed by an active steering actuator. In this embodiment, the transverse movement of the motor vehicle can be readily and very easily adjusted, because an already existing steering system of the motor vehicle is used for affecting the transverse movement, which is supplemented only by additional actuators for an active steering intervention.

Preferably the desired position of the roll axis is predefined in method step a), so that the roll axis falls at least partially in a region which is occupied by a vehicle operator driving the vehicle. The driver of a motor vehicle usually sits at a fixed predetermined position in the motor vehicle, from which a wide variety of devices for guiding the vehicle (for example, gas pedal, steering wheel, etc.) can be easily operated. This region is specified, for example, by a seat for the driver. Advantageously, the roll axis is displaced so as to be located precisely underneath the driver or underneath the driver seat or to extend through another region where the driver is normally positioned when driving the vehicle. This proximity of the driver to the roll axis then guarantees that the perceived comfort of the driver is enhanced. The subjective driving comfort for the driver is significantly improved. When the method is used, for example, in conjunction with fully automatic vehicle guidance, the driver can then easily perform activities that are not related to driving the vehicle (e.g. read a book), without increasing the occurrence of adverse medical side effects (such as nausea, dizziness, etc.). The driver does not require information relating to the transverse acceleration as part of the fully automatic travel, which would otherwise be evident (without roll) from the subjective driving sensation. The need for haptic feedback is eliminated and the roll axis is positioned so as to provide an optimal driving sensation for the driver. This is particularly the case when the roll axis is shifted so as to extend through the region of the head or the torso, or through the heart line known from roller coasters.

Furthermore, the desired position of the roll axis predefined in step a) is preferably at least partially further away from a road surface than the position of the roll axis when the vehicle is at rest. Within the context of the method, the roll axis is here set higher above the road surface. With this additional degree of freedom in the displacement of the roll axis, the sense of comfort for the passengers in the motor vehicle can be further improved.

Preferably, in step b), a future transverse acceleration of the motor vehicle is determined with a device for automatic route preview, and both the desired transverse tilt and the desired transverse offset of the motor vehicle are determined with this device in step c). Various input parameters may be considered in the automatic route preview. For example, the respective transverse acceleration may be determined based on the instantaneous speed of the motor vehicle and the current steering angle. In addition, map data showing the course of the roadway may exist. For example, the current vehicle position can then be determined with a satellite signal receiver (e.g. GPS [Global Positioning System]—sensor), and the anticipated transverse acceleration can be determined based on the map information from on the turns ahead of the vehicle. Data obtained with a surround sensor (e.g. video camera, ultrasonic sensors, etc.) may also be used for route preview. Data relating to road inclination can also be important input parameters for determining the expected transverse acceleration. Additionally, the steering angle and the vehicle speed can be measured for determining the current transverse acceleration. With such a device for the automatic route preview, the roll axis can be set not only in response to a current transverse acceleration which must be measured first, but the anticipated transverse accelerations can also be determined already before they actually occur. In this manner, the spatial position of the roll axis can be quickly and optimally adapted to the respective conditions without time delay. The transverse tilt and the transverse movement of the motor vehicle can thus be set even more smoothly and less abrupt, thereby even further increasing the ride comfort for occupants of motor vehicles.

Preferably, a signal from at least one sensor may be used for determining the transverse acceleration in step b). The sensor may be, in particular, an acceleration sensor (g-Sensor), which measures the respective instantaneous transverse acceleration. However, the sensor may also be, for example, a camera that detects a curve in front of the vehicle and evaluates this information to determine the expected transverse acceleration. The sensor may, for example, also be a laser scanner, which is attached to the vehicle and detects the roadway properties (e.g. roadway inclination). Such sensors allow a particularly precise determination of the respective transverse acceleration and therefore a very precise adjustment of the spatial position of the roll axis.

In a particularly preferred embodiment, the at least one actuator used to influence the transverse tilt of the motor vehicle in step d) may be provided in form of an active suspension system or an active stabilizer. Such suspension or stabilizer systems provide exceptional dynamic control of the vehicle tilt and allow a quick and customized adaptation to the particular situation.

Furthermore, the method according to the invention may advantageously be carried out as part of fully automatic vehicle guidance. As part of semi-automatic vehicle guidance, a plurality of relevant driving operations is no longer performed by the driver himself, but instead by systems of the motor vehicle. The driver intervenes sparingly by performing corrective actions. With fully automatic vehicle guidance, the vehicle travels automatically on a particular course, without requiring a steering intervention by the driver. In particular, the vehicles may operate semi-autonomously. The driver is then at most watching and can devote most of his time to perform activities not related to driving. The subjective sensation of transverse accelerations is no longer required for safely driving the vehicle, but may even be annoying. In this case, a flexible displacement of the spatial position of the roll axis makes it possible to particularly effectively minimize the transverse accelerations acting on a vehicle occupant, thereby enhancing the subjective driving comfort.

Further features of the invention will become apparent from the claims, the drawings and the description of the figures. The features and feature combinations mentioned above in the description as well as the features and feature combinations described in the figure description and/or in the features and feature combinations shown solely in the figures can not only be used in the respective indicated combination, but also in other combinations or severally, without departing from the scope of the invention.

BRIEF DESCRIPTION OF THE DRAWING

The invention will now be explained in more detail with reference to exemplary embodiments, wherein.

Identical or functionally identical elements in the figures are denoted with the same reference symbols.

DETAILED DESCRIPTION OF PREFERRED EMBODIMENTS

Figure 1:
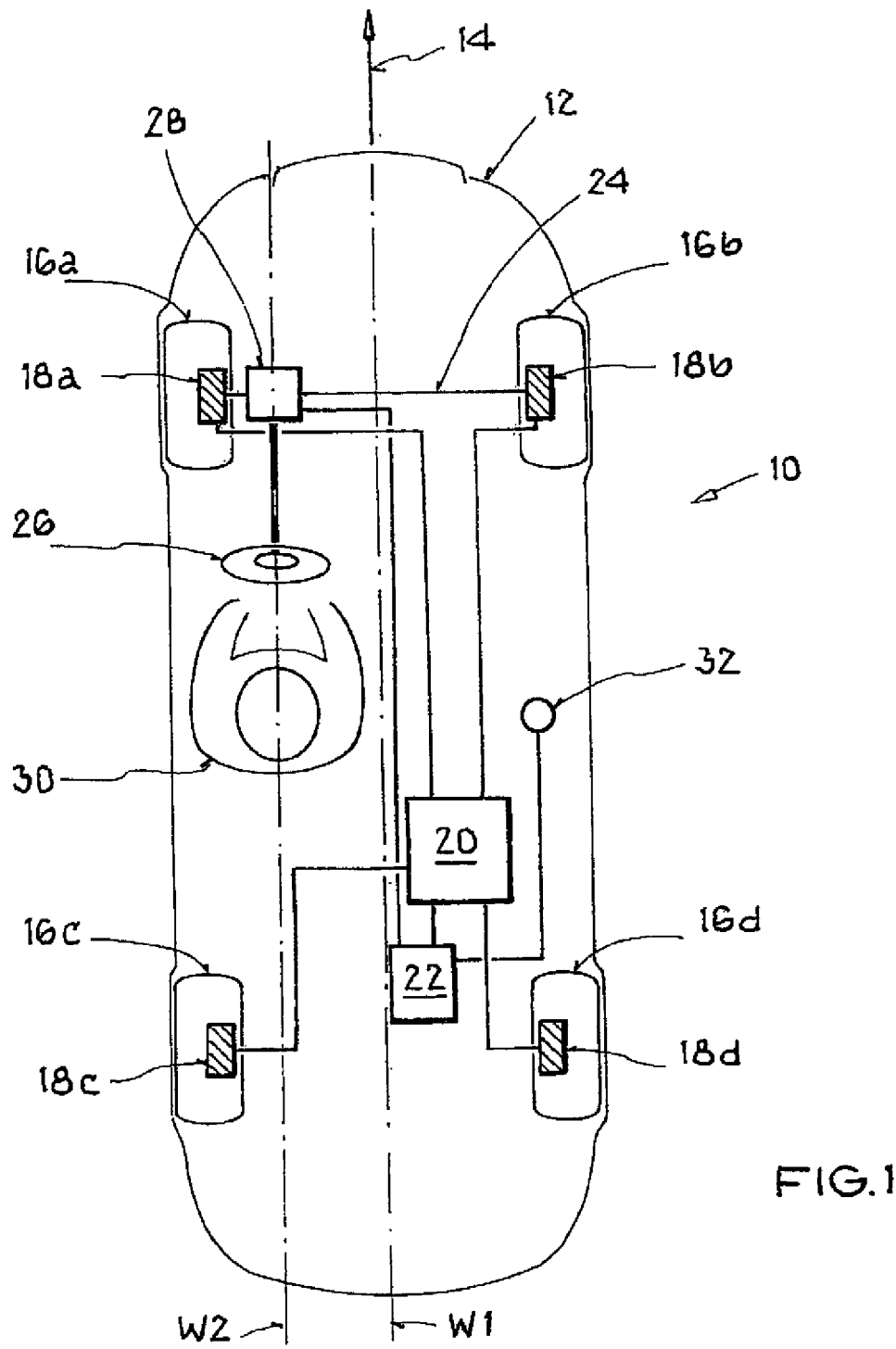
FIG. 1 shows a schematic plan view of a motor vehicle with an active suspension device and an actuator for influencing the steering movement.

FIG. 1 shows a motor vehicle 10 traveling in a direction of travel indicated by arrow the 14. The motor vehicle 10 has near its front side 12 two front wheels 16a and 16b which are connected via a front axle 24. The motor vehicle 10 also includes two rear wheels 16c and 16d. A respective vertical actuator 18a to 18d is associated with each of the wheels 16a-16d; the vertical actuators 18a to 18d are part of an ABC (Active Body Control) actuator system 36. The vertical actuators 18a to 18d are controlled by an ABC control unit 20. This makes it possible to adjust a stroke of each wheel individually. For example, the vertical actuator 18a may influence the vertical wheel position of the wheel 16a. The ABC control unit 20 is connected to a control unit 22 which controls semi-automatic or fully automatic vehicle guidance. Alternatively, the ABC control unit 20 and the control unit 22 may also be part of a common control unit. The motor vehicle 10 also includes a sensor 32, which allows a measurement of the instantaneous transverse acceleration of the motor vehicle 10. The sensor 32 is connected to the control unit 22 and transmits the measurement information regarding the transverse acceleration to the control unit 22.

The front wheels 16a and 16b are steerable via a steering system 26, i.e. the steering angle can be adjusted by the steering system 26. The steering system 26 includes, in particular, a steering wheel that can be operated by a driver 30. In addition to this form of manual steering, the motor vehicle 10 also includes a steering actuator 28 for automatically adjusting the wheel steering angles of the wheels 16a and 16b. To this end, the steering actuator 28 is connected to the control unit 22.

Figure 2:
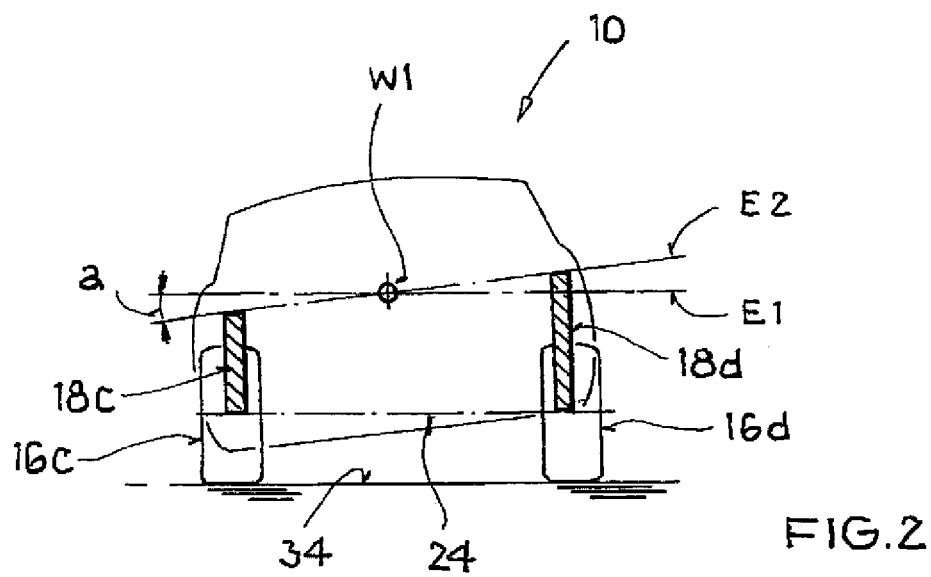
FIG. 2 shows a schematic rear view of a motor vehicle with a conventionally positioned roll axis.

FIG. 2 shows a schematic rear view of a motor vehicle 10 with a conventional roll control. In the exemplary embodiment, the motor vehicle 10 travels through a left turn. To improve the driving comfort for the occupants of the motor vehicle 10, the vertical actuators 18a to 18d are controlled so that the body of the motor vehicle 10 tilts into the left turn. The tilt occurs through a rotation about the roll axis W1 which runs parallel to a road surface 34 through the center of the motor vehicle 10. No transverse forces act on the motor vehicle 10 when driving straight ahead, so that its body is substantially parallel to a plane E1. In a left turn, the body is now tilted with the vertical actuators 18a to 18d by an active roll angle a. The body is substantially parallel to a plane E2, which, however, does no longer run parallel to the road surface 34. The plane E2 then encloses the roll angle a with the plane E1.

Figure 3:
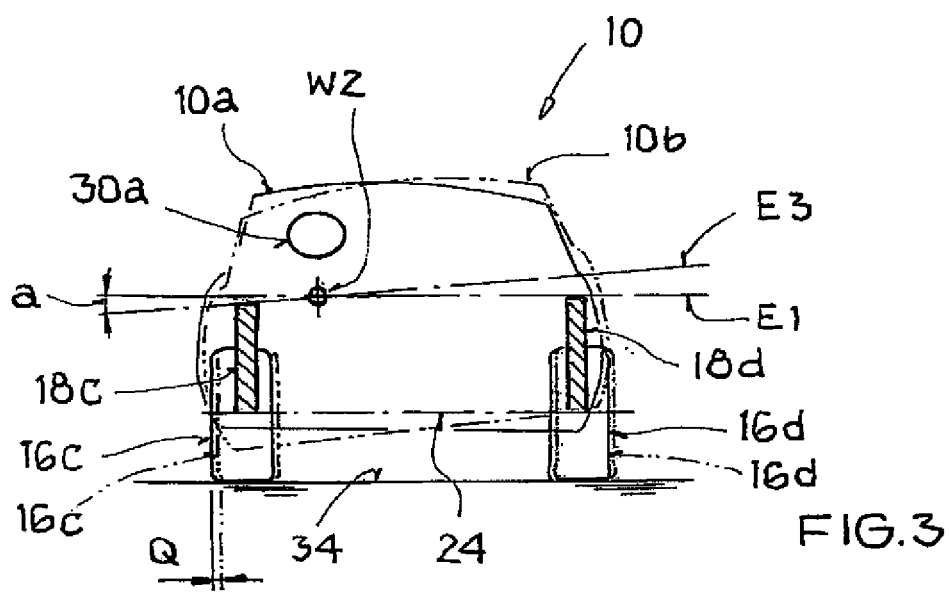
FIG. 3 shows a schematic rear view of a motor vehicle in an initial position and in a position transversely offset thereto, in which the motor vehicle is tilted and the roll axis is transversely displaced.

To enhance the subjective driving comfort for the driver 30, the roll axis W1 is displaced so as to be positioned underneath the head 30a of the driver. The head 30a of the driver and the roll axis W2 are then substantially superimposed above the road surface 34. To displace the roll axis W1, both a tilt movement and a transverse movement of the motor vehicle 10 are initiated. The corresponding initial and final situation is shown here in FIG. 3. Before entering the left turn, the motor vehicle has an orientation commensurate with the representation 10a, with the body extending substantially parallel to the road surface 34. As is generally known, the motor vehicle tilts with the roll angle a when entering the left turn, as shown in the partial image associated with the motor vehicle 10b. The level E3 thereby extends substantially parallel to the body of the motor vehicle 10b and encloses the roll angle a with a plane E1 that extends parallel to the road surface 34.

Additionally, however, a transverse compensation is performed by transversely displacing the motor vehicle 10b by the transverse offset Q relative to the initial position of the motor vehicle 10a. The roll axis W2 is thereby shifted so as to be positioned underneath the head 30a of the driver 30. The roll movement is then associated with a smaller movement of the driver 30, thereby improving the subjective driving sensation for the driver. The transverse acceleration felt by the driver is improved by leaning into the turn.

Figure 4:
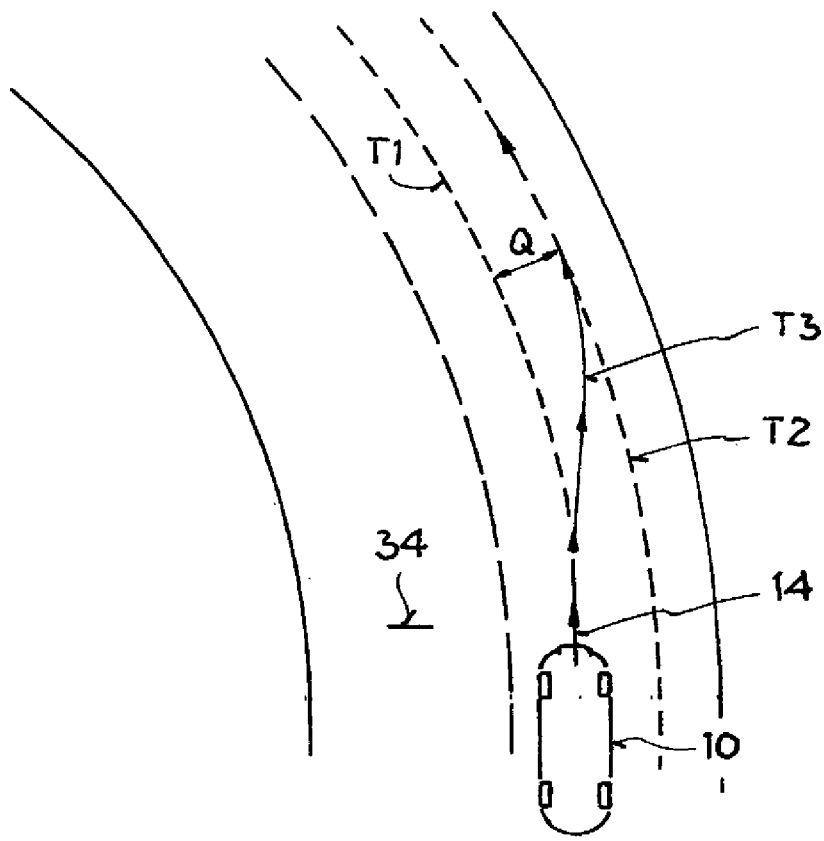
FIG. 4 shows a schematic plan view of a motor vehicle, which performs a transverse movement on a roadway, resulting in a defined transverse offset.

FIG. 4 shows schematically how the transverse offset Q is attained via a transverse movement of the motor vehicle 10 on a trajectory T3. The motor vehicle 10 moves originally on the road surface 34 in a left turn along a trajectory T1. The control unit 22 now actively acts on the steering actuator 28 so as to adjust the spatial position of the roll axis W2, thereby automatically steering the motor vehicle 10. The turn radius is increased, so that the motor vehicle now travels on a trajectory T2 which extends parallel to the trajectory T1. The distance between the two trajectories T1 and T2 defines the transverse offset Q. While the motor vehicle 10 tilts into the left turn and follows at the same time the trajectory T3, the roll axis is effectively displaced so as to be located in the position for the roll axis W2.

To adjust the roll angle a, the control unit 22 measures signals from the sensor 32 and determines from the signals the transverse acceleration. Depending on the respective value of the transverse acceleration, the control unit then determines a suitable transverse tilt having the roll angle a, and a suitable transverse offset Q. The transverse tilt is adjusted by transmitting from the control unit 22 corresponding signals to the ABC control unit 20, with the latter in turn controlling the respective stroke of the individual vertical actuators 18a to 18d. On the other hand, the transverse offset Q is adjusted by transmitting with the control unit 22 corresponding signals to the steering actuator, which intervenes in the steering 26 so as to define a specified wheel steering angle for the wheels 16a and 16b.

Figure 5:
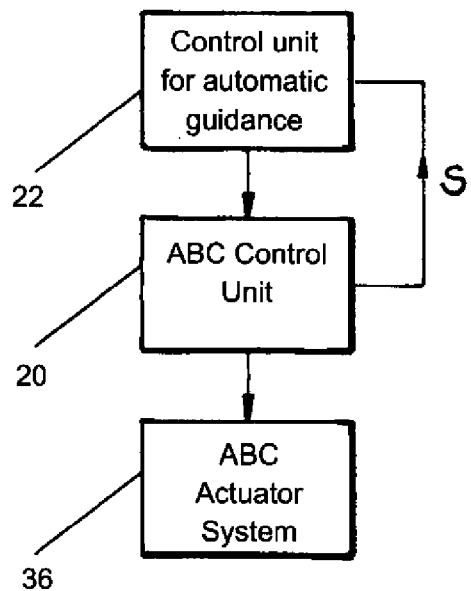
FIG. 5 shows a block diagram of the interaction of the components required for the method according to a specific embodiment.

FIG. 5 illustrates the individual method steps and the cooperation between the respective control units. The control unit 22 is used in particular for semi-automatic or fully automatic vehicle guidance and allows a determination of the transverse acceleration of the motor vehicle 10. Based on the transverse acceleration, the control unit 22 sets a desired transverse tilt and a desired transverse offset of the motor vehicle. The desired transverse tilt is transmitted to the ABC control unit 20 which then adjusts the respective transverse tilt by way of the ABC actuator system 36. The ABC actuator system 36 includes in particular the vertical actuators 18a to 18d. Additionally, a feedback S is provided, wherein a necessary transverse offset Q or a course of the transverse offset is fed back to the control unit 22 for autonomous vehicle guidance. The respective instantaneous transverse tilt also determines, in particular, the transverse offset. In this embodiment, the transverse offset is therefore a function of the current tilt.

Figure 6:
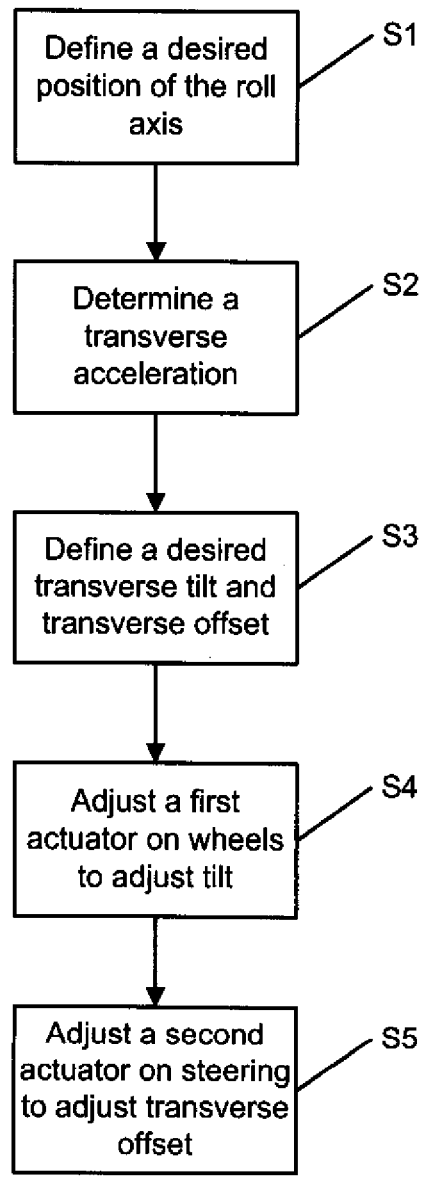
FIG. 6 shows a schematic flow diagram of the method according to the present invention.

FIG. 6 shows a schematic flow diagram of the method according to the present invention. In step S1, A desired spatial position for the roll axis is defined. This desired spatial position can be selected so that a particularly pleasant and largely undisturbed driving sensation results for the occupants of the motor vehicle when the motor vehicle rotates about the roll axis. Thereafter, in step S2, a transverse acceleration of the motor vehicle is determined. The determination can be made, for example, by measuring the current and/or instantaneous transverse acceleration. However, the transverse acceleration of the motor vehicle may also be determined in advance for a future time. This can be accomplished, for example, by using suitable vehicle models through computation and/or as part of a provided route preview. An expected transverse acceleration may also be estimated from existing data. In step S3, a desired transverse tilt of the motor vehicle is defined and a desired transverse offset of the motor vehicle is determined, based on which the roll axis can be shifted into the desired position. In the steps S4 and S5, at least one wheel actuator is adjusted so as to produce the desired transverse tilt (step S4) and at least one steering actuator is adjusted to produce the desired transverse offset (Q) of the motor vehicle (step S5).

The invention claimed is:

1. A method for shifting a spatial position of a roll axis of a motor vehicle from a first spatial position extending through a longitudinal center of the motor vehicle when the motor vehicle travels along a first trajectory having a first radius of curvature to a desired second spatial position transversely offset from the first spatial position, the method comprising:
determining with a sensor installed in the motor vehicle a transverse acceleration of the motor vehicle and adjusting with a controller of the motor vehicle at least one first actuator of an active suspension system of the motor vehicle, so that the motor vehicle assumes a transverse tilt with respect to a road surface about the first roll axis disposed in the spatial first position while travelling along the first trajectory; and
adjusting with the controller of the motor vehicle at least one second actuator which influences by way of a steering intervention a transverse movement of the motor vehicle, causing the motor vehicle to travel along a second trajectory having a desired transverse offset from the first trajectory, and adjusting with the at least one first actuator the desired transverse tilt,
with the adjusted desired transverse tilt in conjunction with the desired transverse offset shifting the roll axis from the first spatial position to the desired second spatial position,
wherein the method is performed in conjunction with fully automated vehicle guidance.

2. The method of claim 1, wherein the defined desired second spatial position of the roll axis falls at least partially into a region that is occupied by a vehicle operator driving the motor vehicle.

3. The method of claim 1, wherein the desired second spatial position of the roll axis is at least partially located farther away from a road surface than the first spatial position of the roll axis.

4. The method of claim 1, further comprising determining with a device for automatic route preview a future transverse acceleration of the motor vehicle occurring at a future time, and determining the desired transverse tilt and the desired transverse offset of the motor vehicle commensurate with the determined future transverse acceleration occurring at the future time.

5. The method of claim 4, wherein the device for automatic route preview determines the future transverse acceleration based on at least one criterion selected from a speed of the motor vehicle, data relating to a course of the road surface, data relating to an inclination of the road surface, and a function for forward-looking longitudinal and transverse guidance.

6. The method of claim 1, wherein the at least one first actuator influencing the transverse tilt of the motor vehicle is provided in an active suspension system or in an active stabilizer.

7. The method of claim 1, wherein the desired spatial position of the second roll axis is defined depending on a number of occupants or depending on a spatial position of at least one occupant in the motor vehicle.

* * * * *